US009327270B2

(12) United States Patent
Stueven et al.

(10) Patent No.: US 9,327,270 B2
(45) Date of Patent: May 3, 2016

(54) METHOD FOR THE CONTINUOUS PRODUCTION OF WATER ABSORBENT POLYMER PARTICLES

(71) Applicant: BASF SE, Ludwigshafen (DE)

(72) Inventors: Uwe Stueven, Bad Soden (DE); Rüdiger Funk, Niedernhausen (DE); Matthias Weismantel, Jossgrund-Oberndorf (DE); Karl J. Possemiers, Speyer (DE); Koen Deboel, Wilrijk (BE)

(73) Assignee: BASF SE, Ludwigshafen (DE)

( * ) Notice: Subject to any disclaimer, the term of this patent is extended or adjusted under 35 U.S.C. 154(b) by 396 days.

(21) Appl. No.: 13/924,717

(22) Filed: Jun. 24, 2013

(65) Prior Publication Data

US 2013/0276325 A1 Oct. 24, 2013

Related U.S. Application Data

(63) Continuation of application No. 12/438,835, filed as application No. PCT/EP2007/060077 on Sep. 24, 2007, now abandoned.

(30) Foreign Application Priority Data

Sep. 25, 2006 (EP) .................................... 06121227

(51) Int. Cl.
| | | |
|---|---|---|
| *C08F 2/00* | (2006.01) | |
| *C08F 20/06* | (2006.01) | |
| *F26B 7/00* | (2006.01) | |
| *B01J 20/30* | (2006.01) | |
| *C08F 6/00* | (2006.01) | |
| *C08J 3/12* | (2006.01) | |
| *C08J 3/24* | (2006.01) | |
| *F26B 17/04* | (2006.01) | |
| *F26B 21/10* | (2006.01) | |
| *F26B 21/12* | (2006.01) | |
| *F26B 25/22* | (2006.01) | |

(52) U.S. Cl.
CPC .............. *B01J 20/3021* (2013.01); *C08F 6/008* (2013.01); *C08J 3/12* (2013.01); *C08J 3/245* (2013.01); *F26B 17/04* (2013.01); *F26B 21/10* (2013.01); *F26B 21/12* (2013.01); *F26B 25/22* (2013.01); *C08J 2300/14* (2013.01); *C08J 2333/02* (2013.01)

(58) Field of Classification Search
CPC .............. C08F 6/008; C08J 3/12; C08J 3/245; C08L 33/02; B01J 20/3021; B01J 2300/14; B01J 2333/02; F26B 21/10; F26B 21/12; F26B 25/22; F26B 17/04
USPC .................................. 34/387; 526/317.1, 222
See application file for complete search history.

(56) References Cited

U.S. PATENT DOCUMENTS

| | | | | |
|---|---|---|---|---|
| 4,920,202 | A | | 4/1990 | Irie et al. |
| 5,229,487 | A | * | 7/1993 | Tsubakimoto ......... B65G 47/19 528/484 |
| 6,565,768 | B1 | * | 5/2003 | Dentler ................... A61L 15/60 252/194 |
| 2004/0242761 | A1 | * | 12/2004 | Dairoku ..................... C08J 3/12 524/556 |
| 2007/0260357 | A1 | * | 11/2007 | Issberner ............... G05B 17/02 700/269 |
| 2008/0214749 | A1 | | 9/2008 | Weismantel et al. | |

FOREIGN PATENT DOCUMENTS

| | | | |
|---|---|---|---|
| EP | 0 289 338 A2 | | 11/1988 |
| WO | WO 2005/122075 | * | 12/2005 |
| WO | WO-2005/122075 A1 | | 12/2005 |
| WO | WO-2006/100300 A1 | | 9/2006 |

OTHER PUBLICATIONS

Buchholz et al. (eds.), *Modern Superabsorbent Polymer Technology*, New York: Wiley-VCH (1998), pp. 71-103.
International Preliminary Report on Patentability (English Translation) for corresponding International Application No. PCT/EP2007/060077, dated Apr. 7, 2009.
International Search Report and Written Opinion for corresponding International Application No. PCT/EP2007/060077, dated Feb. 1, 2008.

* cited by examiner

*Primary Examiner* — William Cheung
(74) *Attorney, Agent, or Firm* — Marshall, Gerstein & Borun LLP

(57) ABSTRACT

A process for continuously preparing water-absorbing polymer beads, comprising the drying of a polymer gel on a forced-air belt dryer, the water content of the polymer gel being used to control the forced-air belt dryer during or after the drying.

15 Claims, No Drawings

METHOD FOR THE CONTINUOUS PRODUCTION OF WATER ABSORBENT POLYMER PARTICLES

CROSS-REFERENCE TO RELATED APPLICATIONS

This is a continuation of U.S. patent application Ser. No. 12/438,835, filed Feb. 25, 2009, which is the U.S. national phase of International Application No. PCT/EP2007/060077, filed Sep. 24, 2007, which claims the benefit of European Patent Application No. 06121227.0, filed Sep. 25, 2006.

The present invention relates to a process for continuously preparing water-absorbing polymer beads, comprising the drying of a polymer gel on a forced-air belt dryer, the water content of the polymer gel being used to control the forced-air belt dryer during or after the drying.

The preparation of water-absorbing polymer beads is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening.

The properties of the water-absorbing polymers can be adjusted via the degree of crosslinking. With increasing degree of crosslinking, the gel strength rises and the centrifuge retention capacity (CRC) falls.

To improve the performance properties, for example saline flow conductivity (SFC) in the diaper and absorbency under load (AUL), water-absorbing polymer beads are generally postcrosslinked. This increases only the degree of crosslinking of the particle surface, which allows absorbency under load (AUL) and centrifuge retention capacity (CRC) to be decoupled at least partly. This postcrosslinking can be performed in aqueous gel phase. However, dried, ground and screened-off polymer beads (base polymer) are preferably coated on the surface with a postcrosslinker, thermally postcrosslinked and dried. Crosslinkers suitable for this purpose are compounds which comprise at least two groups which can form covalent bonds with the carboxylate groups of the hydrophilic polymer.

Typically, the polymerization affords an aqueous polymer gel which has to be dried. The drying of the polymer gel is likewise disclosed in the monograph "Modern Superabsorbent Polymer Technology", F. L. Buchholz and A. T. Graham, Wiley-VCH, 1998, pages 87 to 93. To dry the polymer gel, preference is given to using forced-air belt dryers. The water content of the dried polymer gel is from approx. 1 to 5% by weight.

EP 289 338 A1 describes a process for preparing water-absorbing polymer beads with low residual monomer content. In the drying of the polymer gel, air with a high steam content is used. The steam content of the drying air flowing in is regulated to the desired value under closed-loop control by means of partial recycling of the offgas.

The prior PCT application with the reference number PCT/EP2006/061010 discloses optimal process conditions for the drying of the polymer gel on a forced-air belt dryer.

WO 2005/122075 A1 describes a continuous process for preparing water-absorbing polymer beads, the process being controlled by means of an artificial neuronal network. The neuronal network can be utilized, for example, in order to calculate the effects of planned changes on the product quality. However, it is also possible to use the neuronal network for process control. In the process disclosed, as well as other parameters, it is also possible to determine the residual water content after the drying, the subsequent grinding of the dried polymer gel being adjusted to the particular water content (page 19 lines 3 to 8).

It was an object of the present invention to provide an improved process for continuously preparing water-absorbing polymer beads. In particular, the process should feature a high process stability.

The object is achieved by a process for continuously preparing water-absorbing polymer beads, comprising
i) polymerization of a monomer solution to obtain a polymer gel,
ii) drying of the polymer gel on a forced-air belt dryer, the forced-air belt dryer having at least one drying chamber,
iii) comminution of the dried polymer gel to obtain polymer beads,
iv) classification of the polymer beads and
v) postcrosslinking of the classified polymer beads,
wherein the water content of the polymer gel, during or after the drying of the polymer gel ii) and before the postcrosslinking v), is determined continuously and used as a controlled variable for the forced-air belt dryer, and the controller output derived from the control procedure is adjusted continuously in the event of a deviating target value.

In this context, "continuously" means that the water content is typically determined at least once in 10 minutes, preferably at least once in one minute, more preferably at least once in 30 seconds, most preferably at least once in 10 seconds. In this context, "adjusted continuously" means that the controller output is adjusted typically at least once in 10 minutes, preferably at least once in one minute, more preferably at least once in 30 seconds, most preferably at least once in 10 seconds.

The forced-air belt dryer has preferably from 1 to 30, more preferably from 3 to 20, most preferably from 5 to 15, drying chambers. A drying chamber is a region in which the temperature and the amount of the air flowing in can be adjusted independently of one another.

The polymer gel has a residence time in the range from 20 to 40 minutes on the forced-air belt dryers used. A forced-air belt dryer therefore reacts only very slowly to changes in the process parameters, such as change in the air temperature, air speed (air rate) and conveyor belt speed.

In particular, a change in the conveyor belt speed simultaneously changes the area coverage of the conveyor belt and the capacity of the overall production. Both lead to undesired feedback in the overall system.

Therefore, air temperature, air speed (air rate) and conveyor belt speed were adjusted to the properties of the polymer gel to be dried, but not changed any further during production. Slight changes in the water content also did not lead to changes in the quality of the dried polymer gel.

It was, however, known that the water content has an influence on the mechanical stability and hence the subsequent comminution. It thus appears to be sufficient, though, to adjust the subsequent comminution continuously to changes in the water content.

The present invention is based on the finding that the water content of the dried polymer gel after the drying ii) and before the postcrosslinking v) has a crucial influence on the properties, especially the absorbency under load, of the postcrosslinked water-absorbing polymer beads. Even small upward or downward deviations lead to significantly poorer products.

The continuous control of the water content during or after the drying ii) and before the postcrosslinking v) is therefore obligatory for a high and uniform product quality. However, it is also possible to control the water content of the polymer gel during the drying, for example in the last drying chamber or in a region of drying where the mean water content is already less than 10% by weight, the water content being determined by the EDANA (European Disposables and Nonwovens Association) recommended test method No. 430.2-02 "Moisture content".

The water-absorbing polymer beads have a centrifuge retention capacity (CRC) of typically at least 15 g/g, preferably at least 20 g/g, preferentially at least 25 g/g, more preferably at least 30 g/g, most preferably at least 35 g/g. The centrifuge retention capacity (CRC) of the water-absorbing polymer beads is typically less than 60 g/g, the centrifuge retention capacity (CRC) being determined by the EDANA (European Disposables and Nonwovens Association) recommended test method No. 441.2-02 "Centrifuge retention capacity".

The drying of the polymer gel ii) is preferably controlled in such a way that the water content of the polymer gel at the measurement point deviates by less than 1.5% by weight from the mean value over a period of at least one hour and the mean value for the water content at the measurement point is less than 10% by weight, the water content being determined by the EDANA (European Disposables and Nonwovens Association) recommended test method No. 430.2-02 "Moisture content".

The water content is preferably determined before the classification iv), more preferably before the comminution iii), most preferably on the forced-air belt dryer.

The water content of the dried polymer gel, after the drying ii) and before the postcrosslinking v), is preferably from 1 to 10% by weight, more preferably from 2 to 8% by weight, most preferably from 3 to 6% by weight.

It is possible to use the conveyor belt speed of the forced-air belt dryer as a controller output. The conveyor belt speed is preferably from 0.005 to 0.05 m/s, more preferably from 0.01 to 0.03 m/s, more preferably from 0.015 to 0.025 m/s.

The polymer gel to be dried is advantageously metered from a buffer vessel onto the conveyor belt. This allows the conveyor belt coverage to be absorbed when the conveyor belt speed is changed by corresponding change in the metering rate. Undesired feedback to the overall process is avoided.

It is also possible to use the speed of the air flowing in as a controller output. The speed of the air flowing in is preferably from 0.5 to 5 m/s, more preferably from 0.8 to 3 m/s, more preferably from 1 to 2 m/s.

It is also possible to use the gas inlet temperature of the forced-air belt dryer as a controller output. The gas inlet temperature of the forced-air belt dryer is preferably from 50 to 250° C., more preferably from 100 to 200° C., more preferably from 150 to 180° C.

In a preferred embodiment of the present invention, a closed-loop control system is used, i.e. the correction value of one controller is the controlled variable of a further controller.

It has been found that changes in the gas inlet temperature of the forced-air belt dryer, the speed of the air flowing in and the conveyor belt speed lead to a change in the water content during or after the drying with a different delay. The time delay is the greatest when the gas inlet temperature of the forced-air belt dryer is used as the controller output and the smallest when the conveyor belt speed is used as the controller output.

Advantageously, the water content of the dried polymer gel is therefore controlled by means of a controller output with a small time delay. This controller output can then be used as a controlled variable in a second controller which has a controller output with greater time delay.

For example, the water content after the drying can be controlled by means of the conveyor belt speed (first control system). At the same time, a target value is determined for the conveyor belt speed. When the first control system leads to a deviation in the conveyor belt speed from the target value, the speed of the air flowing in is adjusted in at least one drying chamber (second control system). The second control system is adjusted to have a slower response than the first control system. The second control system then has the effect that the conveyor belt speed oscillates back to the target value.

A target value can likewise be determined for the speed of the air flowing in. When the second control system leads to a deviation in the speed of the air flowing in from the target value, the gas inlet temperature is adjusted in the drying chamber in question (third control system). The third control system is adjusted to have a slower response than the second control system. The third control system then has the effect that the speed of the air flowing in oscillates back to the target value.

Advantageously, the controller outputs have upper and lower limits. This avoids impermissibly high air speeds and air temperatures in the corresponding drying chambers.

The water content of the polymer can be determined directly or indirectly during or after the drying ii) and before the crosslinking v).

A direct measurement is, for example, a measurement of the water content via the dielectric constant. A suitable measurement unit is, for example, the MMS 2 moisture probe (ACO Automation Components; Wutöschingen-Horheim; Germany).

Such a probe can be installed, for example, in a buffer vessel directly downstream of the forced-air belt dryer. However, it is also possible to mount the probe on a sliding carriage and to place the sliding carriage onto the dried polymer gel in the downstream region of the forced-air belt dryer.

An indirect measurement is, for example, the determination of the steam absorption of the drying air in the last drying chamber. In this region, the steam absorption correlates directly with the water content of the polymer gel.

The monomer solutions usable in the process according to the invention comprise, for example, at least one ethylenically unsaturated monomer a), optionally at least one crosslinker b), at least one initiator c) and water d).

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The preferred monomers a) have at least one acid group, the acid groups preferably having been at least partly neutralized.

The proportion of acrylic acid and/or salts thereof in the total amount of monomers a) is preferably at least 50 mol %, more preferably at least 90 mol % and most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol is understood to mean compounds of the following formula

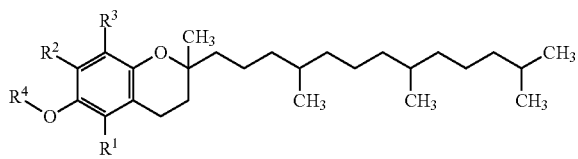

where $R^1$ is hydrogen or methyl, $R^2$ is hydrogen or methyl, $R^3$ is hydrogen or methyl, and $R^4$ is hydrogen or an acyl radical having from 1 to 20 carbon atoms.

Preferred radicals for $R^4$ are acetyl, ascorbyl, succinyl, nicotinyl and other physiologically compatible carboxylic acids. The carboxylic acids may be mono-, di- or tricarboxylic acids.

Preference is given to alpha-tocopherol where $R^1=R^2=R^3$=methyl, in particular racemic alpha-tocopherol. $R^1$ is more preferably hydrogen or acetyl. RRR-alpha-tocopherol is especially preferred.

The monomer solution comprises preferably at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

Crosslinkers b) are compounds having at least two free-radically polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 314 56 A1 and DE-A 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 100 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of 40-tuply ethoxylated glycerol, of 40-tuply ethoxylated trimethylolethane or of 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The amount of crosslinkers b) is preferably from 0.01 to 5% by weight, more preferably from 0.05 to 2% by weight, most preferably from 0.1 to 1% by weight, based in each case on the monomer solution.

The initiators c) used may be all compounds which disintegrate into free radicals under the polymerization conditions, for example peroxides, hydroperoxides, hydrogen peroxide, persulfates, azo compounds and redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane]dihydrochloride and 2,2'-azobis[2-(5-methyl-2-imidazolin-2-yl)propane]dihydrochloride, and photoinitiators such as 2-hydroxy-2-methylpropio-phenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)-phenyl]-2-hydroxy-2-methyl-1-propan-1-one, and mixtures thereof.

The initiators are used in customary amounts, for example in amounts of from 0.001 to 5% by weight, preferably from 0.01 to 1% by weight, based on the monomers a).

For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

The preparation of a suitable polymer and also further suitable hydrophilic ethylenically unsaturated monomers a) are described in DE 199 41 423 A1, EP 686 650 A1, WO 2001/45758 A1 and WO 2003/104300 A1.

Suitable reactors are kneading reactors or belt reactors. In the kneader, the polymer gel formed in the polymerization of an aqueous monomer solution is comminuted continuously by, for example, contrarotatory stirrer shafts, as described in WO 2001/38402 A1. The polymerization on the belt is described, for example, in DE 38 25 366 A1 and U.S. Pat. No.

6,241,928. Polymerization in a belt reactor forms a polymer gel which has to be comminuted in a further process step, for example in a meat grinder, extruder or kneader.

Advantageously, the hydrogel, after leaving the polymerization reactor, is then stored, for example in insulated vessels, at elevated temperature, preferably at least 50° C., more preferably at least 70° C., most preferably at least 80° C., and preferably less than 100° C. The storage, typically for from 2 to 12 hours, further increases the monomer conversion.

In the case of relatively high monomer conversions in the polymerization reactor, the storage can also be shortened significantly or storage can be dispensed with.

The acid groups of the resulting polymer gels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the polymer gel stage. It is also possible to neutralize up to 40 mol %, preferably from 10 to 30 mol % and more preferably from 15 to 25 mol % of the acid groups before the polymerization by adding a portion of the neutralizing agent to the monomer solution and setting the desired final degree of neutralization only after the polymerization, at the hydrogel stage. When the polymer gel is neutralized at least partly after the polymerization, the polymer gel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The polymer gel is dried with a forced-air belt dryer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 30% and 80% by weight. It is particularly advantageous to vent the dryer with nitrogen or another nonoxidizing inert gas. If desired, however, it is also possible simply just to lower the partial pressure of the oxygen during the drying in order to prevent oxidative yellowing processes.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer beads removed as the product fraction is preferably at least 200 μm, more preferably from 250 to 600 μm, very particularly from 300 to 500 μm. The mean particle size of the product fraction may be determined by means of the EDANA (European Disposables and Nonwovens Association) recommended test method No. 420.2-02 "Particle size distribution", where the proportions by mass of the screen fractions are plotted in cumulated form and the mean particle size is determined graphically. The mean particle size here is the value of the mesh size which gives rise to a cumulative 50% by weight.

To further improve the properties, the polymer beads may be postcrosslinked. Suitable postcrosslinkers are compounds which comprise groups which can form covalent bonds with the at least two carboxylate groups of the hydrogel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1, 2-oxazolidone and its derivatives, such as 2-hydroxyethyl-2-oxazolidone, in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/31482 A1.

In addition, it is also possible to use postcrosslinkers which comprise additional polymerizable ethylenically unsaturated groups, as described in DE 37 13 601 A1.

The amount of postcrosslinker is preferably from 0.01 to 1% by weight, more preferably from 0.05 to 0.5% by weight, most preferably from 0.1 to 0.2% by weight, based in each case on the polymer.

In a preferred embodiment of the present invention, polyvalent cations are applied to the particle surface in addition to the postcrosslinkers.

The polyvalent cations usable in the process according to the invention are, for example, divalent cations such as the cations of zinc, magnesium, calcium and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred. Apart from metal salts, it is also possible to use polyamines as polyvalent cations.

The amount of polyvalent cation used is, for example, from 0.001 to 0.5% by weight, preferably from 0.005 to 0.2% by weight, more preferably from 0.02 to 0.1% by weight, based in each case on the polymer.

The postcrosslinking is typically performed in such a way that a solution of the postcrosslinker is sprayed onto the hydrogel or the dry polymer beads. The spraying is followed by thermal drying, and the postcrosslinking reaction can take place either before or during the drying.

The spraying of a solution of the crosslinker is preferably performed in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lodige mixers, Bepex mixers, Nauta mixers, Processall mixers and Schugi mixers.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a staged dryer, a rotary tube oven or a heatable screw. It is particularly advantageous to mix and dry in a fluidized bed dryer.

Preferred drying temperatures are in the range from 100 to 250° C., preferably from 120 to 220° C. and more preferably from 130 to 210° C. The preferred residence time at this temperature in the reaction mixer or dryer is preferably at least 10 minutes, more preferably at least 20 minutes, most preferably at least 30 minutes.

Subsequently, the postcrosslinked polymer can be classified again.

The mean diameter of the water-absorbing polymer beads is preferably at least 200 µm, more preferably from 250 to 600 µm, most preferably from 300 to 500 µm. 90% of the polymer beads have a diameter of preferably from 100 to 800 µm, more preferably from 150 to 700 µm, most preferably from 200 to 600 µm.

Methods:

The measurements should, unless stated otherwise, be performed at an ambient temperature of 23±2° C. and a relative atmospheric humidity of 50±10%. The water-absorbing polymers are mixed thoroughly before the measurement.

Water Content

The water content of the water-absorbing polymer beads is determined by the EDANA (European Disposables and Nonwovens Association) recommended test method No. 430.2-02 "Moisture content".

Centrifuge Retention Capacity (CRC)

The centrifuge retention capacity of the water-absorbing polymer beads is determined by the EDANA (European Disposables and Nonwovens Association) recommended test method No. 441.2-02 "Centrifuge retention capacity".

Absorbency Under Load (AUL0.7 psi)

The absorbency under load of the water-absorbing polymer beads is determined by the EDANA (European Disposables and Nonwovens Association) recommended test method No. 442.2-02 "Absorption under pressure", using a weight of 0.7 psi (49 g/cm$^2$) instead of a weight of 0.3 psi (21 g/cm$^2$).

Extractables

The content of extractables (extractable fractions) of the water-absorbing polymer beads is determined by the EDANA (European Disposables and Nonwovens Association) recommended test method No. 470.2-02 "Extractable".

The EDANA test methods are obtainable, for example, from the European Disposables and Nonwovens Association, Avenue Eugene Plasky 157, B-1030 Brussels, Belgium.

EXAMPLES 1 TO 3

A 38.8% by weight acrylic acid/sodium acrylate solution was prepared by continuously mixing water, 50% by weight sodium hydroxide solution and acrylic acid, such that the degree of neutralization was 71.3 mol %. After the components had been mixed, the monomer solution was cooled continuously by a heat exchanger.

The polyethylenically unsaturated crosslinker used is polyethylene glycol-400 diacrylate (diacrylate of a polyethylene glycol having a mean molar mass of 400 g/mol). The amount used was 2 g per t of monomer solution.

To initiate the free-radical polymerization, the following components were used: hydrogen peroxide (1.03 kg (0.25% strength by weight) per t of monomer solution), sodium peroxodisulfate (3.10 kg (15% strength by weight) per t of monomer solution), and ascorbic acid (1.05 kg (1% strength by weight) per t of monomer solution).

The throughput of the monomer solution is 20 t/h.

The individual components are metered continuously into a List Contikneter continuous kneader with capacity 6.3 m$^3$ (from List, Arisdorf, Switzerland) in the following amounts:

| | |
|---|---|
| 20 t/h | of monomer solution |
| 40 kg/h | of polyethylene glycol-400 diacrylate |
| 82.6 kg/h | of hydrogen peroxide solution/sodium peroxodisulfate solution |
| 21 kg/h | of ascorbic acid solution |

Between the addition points for crosslinker and initiators, the monomer solution was inertized with nitrogen.

At the end of the reactor, 1000 kg/h of removed undersize with a particle size of less than 150 µm were additionally metered in.

At the feed, the reaction solution had a temperature of 23.5° C. The reactor was operated with a speed of the shafts of 38 rpm. The residence time of the reaction mixture in the reactor was 15 minutes.

After polymerization and gel comminution, the aqueous polymer gel was placed onto a forced-air belt dryer. The residence time on the dryer belt was approx. 37 minutes.

The dried hydrogel was ground and screened. The fraction with particle size from 150 to 850 µm was postcrosslinked.

The postcrosslinker solution was sprayed onto the polymer beads in a Schugi mixer (from Hosokawa-Micron B.V., Doetichem, The Netherlands). The postcrosslinker solution was a 3.3% by weight solution of 2-hydroxyethyl-2-oxazolidinone in propylene glycol/water, weight ratio 1:2.3).

The following amounts were metered in:

| | |
|---|---|
| 7.5 t/h | of water-absorbing polymer beads (base polymer) |
| 232.5 kg/h | of postcrosslinker solution |

Subsequently, the polymer beads were dried and postcrosslinked at 190° C. in a Nara paddle dryer (from GMF Gouda, Waddinxveen, The Netherlands) for 45 minutes.

The postcrosslinked polymer beads were cooled to 60° C. in a Nara paddle dryer (from GMF Gouda, Waddinxveen, The Netherlands).

The cooled polymer beads were screened off to a particle size of from 150 to 850 µm.

The properties of the water-absorbing polymer beads were determined before and after the postcrosslinking. The results are compiled in tables 1 and 2.

TABLE 1

Properties before the postcrosslinking

| Example | Water content | CRC | AUL0.7 psi | Extractables |
|---|---|---|---|---|
| 1 | 2.4% by wt. | 38.1 g/g | 8.4 g/g | 10.9% by wt. |
| 2 | 4.0% by wt. | 37.6 g/g | 8.1 g/g | 10.6% by wt. |
| 3 | 6.3% by wt. | 36.8 g/g | 8.0 g/g | 10.5% by wt. |

TABLE 2

| | Properties after the postcrosslinking | |
|---|---|---|
| Example | CRC | AUL0.7 psi |
| 1 | 32.7 g/g | 19.8 g/g |
| 2 | 32.0 g/g | 24.6 g/g |
| 3 | 32.3 g/g | 21.8 g/g |

The results show that the water content after the drying in the range investigated has no influence on the quality of the water-absorbing polymer beads before the postcrosslinking.

However, the water content after the drying has a crucial influence on the absorbency under load after the postcrosslinking. The results demonstrate a pronounced maximum.

The invention claimed is:

1. A process for continuously preparing water-absorbing polymer beads, comprising
    i) polymerization of a monomer solution to obtain a polymer gel,
    ii) drying of the polymer gel on a forced-air belt dryer, the forced-air belt dryer having at least one drying chamber,
    iii) comminution of the dried polymer gel to obtain polymer beads,
    iv) classification of the polymer beads and
    v) postcrosslinking of the classified polymer beads,
    wherein a water content of the polymer gel, during or after the drying of the polymer gel ii) and before the postcrosslinking v), is determined continuously and used as a controlled variable for the forced-air belt dryer, and a controller output derived from the controlled variable is adjusted continuously in the event of a deviating target value, for water content
    and wherein the controller output is one or more of a conveyor belt speed of the forced-air belt dryer, a speed of air flowing in the forced-air belt dryer, and a gas inlet temperature of the forced air dryer.

2. The process according to claim 1, wherein the drying of the polymer gel ii) is controlled in such a way that the water content of the polymer gel at a measurement point deviates by less than 1.5% by weight from a mean value over a period of at least one hour and the mean value for the water content at the measurement point is less than 10% by weight.

3. The process according to claim 1, wherein the water content of the dried polymer gel is from 1 to 10% by weight.

4. The process according to claim 1, wherein the conveyor belt speed of the forced-air belt dryer is used as a controller output.

5. The process according to claim 4, wherein the conveyor belt speed is from 0.005 to 0.05 m/s.

6. The process according to claim 1, wherein a speed of air flowing in the forced-air belt dryer is used as a controller output.

7. The process according to claim 6, wherein the speed of the air flowing in is from 0.5 to 5 m/s.

8. The process according to claim 1, wherein the gas inlet temperature of the forced-air belt dryer is used as a controller output.

9. The process according to claim 8, wherein the gas inlet temperature is from 50 to 250° C.

10. The process according to claim 1, wherein the water content of the polymer gel is determined indirectly.

11. The process according to claim 1, wherein the water content of the polymer gel is determined directly.

12. The process according to claim 1, wherein the water-absorbing polymer beads comprise at least partly neutralized polymerized acrylic acid to an extent of at least 50 mol %.

13. The process according to claim 1, wherein the water-absorbing polymer beads comprise from 0.001 to 5% by weight of a copolymerized crosslinker.

14. The process according to claim 1, wherein the water-absorbing polymer beads have a centrifuge retention capacity of at least 15 g/g.

15. The process according to claim 1, wherein a a first control system adjusts a conveyor belt speed on a deviation of the target value of the water content after the drying, a second control system adjusts the speed of air flowing in at least one drying chamber on deviation of the target value of the conveyor belt speed, and a third control system adjusts the gas inlet temperature in the at least one drying chamber on the deviation of the target value of the air flowing in the at least one drying chamber.

* * * * *